(12) United States Patent
Chauvel et al.

(10) Patent No.: US 7,434,029 B2
(45) Date of Patent: Oct. 7, 2008

(54) INTER-PROCESSOR CONTROL

(75) Inventors: Gerard Chauvel, Antibes (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 129 days.

(21) Appl. No.: 10/631,120

(22) Filed: Jul. 31, 2003

(65) Prior Publication Data
US 2004/0088524 A1 May 6, 2004

Related U.S. Application Data

(60) Provisional application No. 60/400,391, filed on Jul. 31, 2002.

(30) Foreign Application Priority Data
Jul. 30, 2003 (EP) .................................. 03291924

(51) Int. Cl.
*G06F 9/00* (2006.01)
(52) U.S. Cl. ........................ 712/205; 712/229
(58) Field of Classification Search ................. 712/229, 712/205
See application file for complete search history.

(56) References Cited

U.S. PATENT DOCUMENTS

| | | | | |
|---|---|---|---|---|
| 5,854,913 A * | 12/1998 | Goetz et al. | .................. | 712/210 |
| 6,098,089 A | 8/2000 | O'Connor et al. | ........... | 709/104 |
| 6,230,278 B1 * | 5/2001 | Li et al. | ........................ | 713/324 |
| 6,240,468 B1 * | 5/2001 | Capelli | .......................... | 710/14 |
| 6,308,255 B1 * | 10/2001 | Gorishek et al. | ........... | 712/209 |
| 6,480,952 B2 * | 11/2002 | Gorishek et al. | ............. | 712/227 |
| 6,505,290 B1 * | 1/2003 | Moyer et al. | ................... | 712/34 |
| 6,567,905 B2 | 5/2003 | Otis | ........................... | 711/170 |
| 6,571,260 B1 | 5/2003 | Morris | ......................... | 707/206 |
| 6,598,098 B1 * | 7/2003 | Agami et al. | .................. | 710/29 |
| 6,681,318 B2 * | 1/2004 | Chaudhry et al. | ........... | 712/207 |
| 6,832,305 B2 * | 12/2004 | Park et al. | ...................... | 712/34 |
| 6,865,663 B2 * | 3/2005 | Barry | ........................... | 712/34 |

(Continued)

FOREIGN PATENT DOCUMENTS

EP 0811922 A 12/1997

(Continued)

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

*Primary Examiner*—Eddie P Chan
*Assistant Examiner*—Jacob Petranek
(74) *Attorney, Agent, or Firm*—Ronald O. Neerings; Wade James Brady, III; Frederick J. Telecky, Jr.

(57) ABSTRACT

A system includes a first processor coupled to a second processor. The first and second processors are coupled to memory. The first processor fetches and executes supported instructions until an unsupported instruction is detected. The second processor executes the unsupported instruction. If there are less than a threshold number of consecutive supported instructions before the next unsupported instruction, the second processor loads the instructions in the first processor for execution so that the first processor does not fetch the instructions. If there are more than a threshold number of consecutive supported instructions before the next unsupported instruction, the first processor fetches and executes those instructions.

22 Claims, 1 Drawing Sheet

U.S. PATENT DOCUMENTS

| | | | |
|---|---|---|---|
| 6,944,746 B2 * | 9/2005 | So | 712/34 |
| 6,950,929 B2 * | 9/2005 | Chung et al. | 712/241 |
| 7,117,389 B2 * | 10/2006 | Luick | 714/11 |
| 7,200,741 B1 * | 4/2007 | Mine | 712/244 |
| 2002/0065990 A1 | 5/2002 | Chauvel et al. | 711/137 |
| 2002/0069332 A1 | 6/2002 | Chauvel et al. | 711/144 |
| 2003/0101320 A1 | 5/2003 | Chauvel et al. | 711/154 |

FOREIGN PATENT DOCUMENTS

| | | |
|---|---|---|
| WO | WO 02 21268 A | 3/2002 |

* cited by examiner

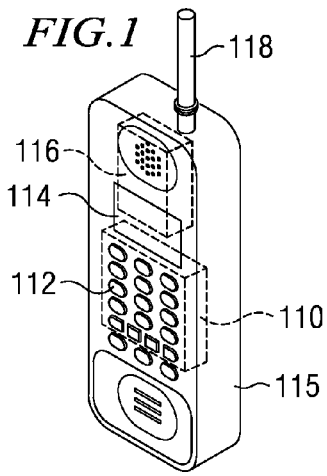
*FIG. 1*
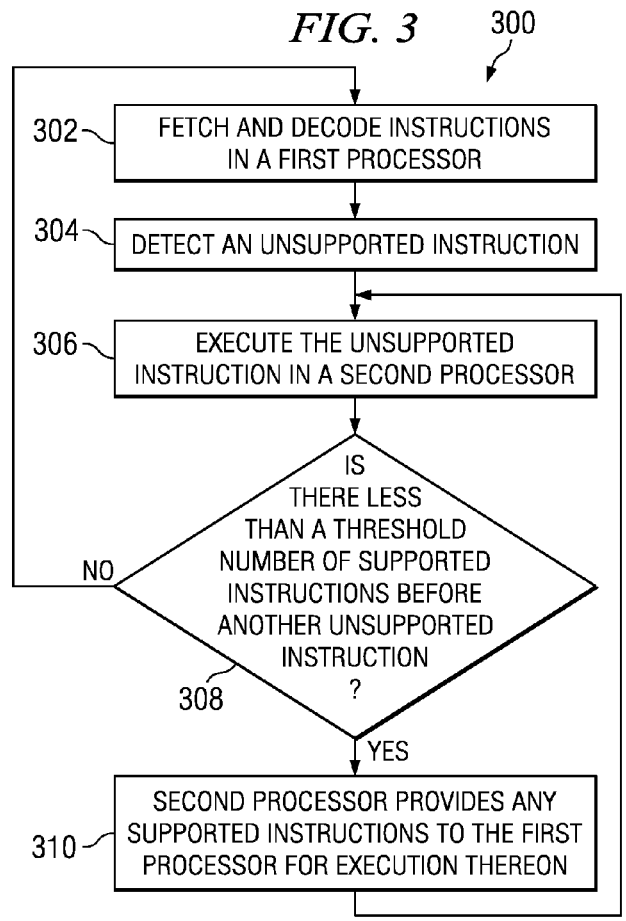
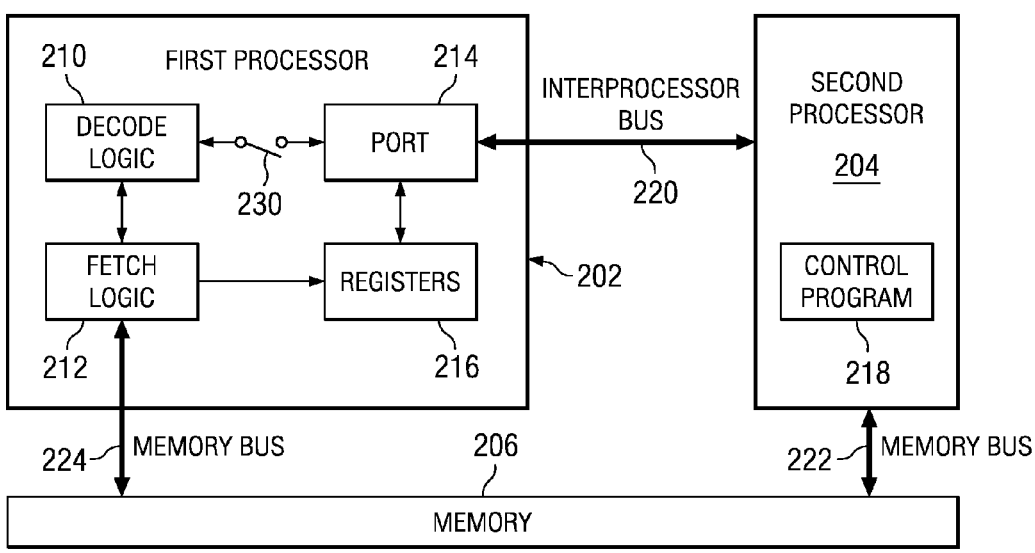

INTER-PROCESSOR CONTROL

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291924.3, filed Jul. 30, 2003 and entitled "Inter-Processor Control," incorporated herein by reference. This application also may contain subject matter that may relate to the following commonly assigned co-pending applications incorporated herein by reference: "System And Method To Automatically Stack And Unstack Java Local Variables," filed Jul. 31, 2003, now U.S. Pat. No. 7,069,415; "Memory Management Of Local Variables," Ser. No. 10/632,067, filed Jul. 31, 2003; "Memory Management Of Local Variables Upon A Change Of Context," Ser. No. 10/623,076, filed Jul. 31, 2003; "A Processor With A Split Stack," filed Jul. 31, 2003, now U.S. Pat. No. 7,058,765; "Using IMPDEP2 For System Commands Related To Java Accelerator Hardware" Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003, "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/623,215, filed Jul. 31, 2003; "Synchronization Of Processor States," Ser. No. 10/632,024, filed Jul. 31, 2003; "Conditional Garbage Base On Monitoring To Improve Real Time Performance," Ser. No. 10/631,195, filed Jul. 31, 2003; "Cache Coherency In A Multi-Processor System," filed Jul. 31, 2003, now U.S. Pat. No. 6,996,683; "Concurrent Task Execution In A Multi-Processor, Single Operating System Environment," Ser. No. 10/623,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to processors and more specifically to coordinating the operation of multiple processors.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY OF THE PREFERRED EMBODIMENTS

As disclosed herein, a system includes a first processor, a second processor coupled to the first processor, and memory coupled to both first and second processors. The first processor fetches supported instructions from memory and executes those instructions in a "run mode" until an unsupported instruction is detected. In accordance with at least some embodiments of the invention, the second processor executes the unsupported instruction and determines whether there are less than a threshold number of supported instructions before another unsupported instruction. If there are less than the threshold number of supported instructions before another unsupported instruction, the first processor transitions to a "step-by-step" mode, wherein the second processor provides the "less than the threshold number of supported instructions" to the first processor so that the first processor executes, but does not fetch the instructions. If there are more than the threshold number of supported instructions before another unsupported instruction, the first processor transitions to the "run mode" in order to fetch and execute the instructions until the next unsupported instruction is detected.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 depicts a communication device in which a preferred embodiment of the invention may be implemented;

FIG. 2 shows a diagram of a system in accordance with an embodiment of the invention; and FIG. 3 shows a flowchart illustrating a method of coordinating the operation of multiple processors in accordance with an embodiment of the invention.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein generally relates to processing systems that use a plurality of processors. The use of multiple processors may provide a variety of benefits, such as, faster processing, greater throughput, multi-tasking, etc., but may also require a more complex control scheme than systems that use a single processor. In particular, the preferred embodiment of the invention disclosed herein relates to coordinating the operation of multiple processors, wherein at least one of the processors has a plurality of instruction execution modes.

In some processing systems, multiple processors may be used to run applications comprising a plurality of instructions. A first processor may execute some of the instructions and a second processor may execute other instructions. In some embodiments, the instructions of an application are executed in a program order (i.e., the instructions are not executed out of order or in parallel by the first and second processors). For example, the first processor may execute one or more consecutive instructions, during which the second processor waits or performs another task until an instruction to be executed by the second processor is encountered by the first processor. The second processor executes the next instruction (or multiple instructions), during which time the first processor waits or performs another task. The overhead (e.g., the performance cost of switching context and launching processes) related to using multiple processors as described above can be reduced by coordinating two or more execution modes of the first processor and/or second processor with a known order (i.e. arrangement, pattern, etc.) of instructions to be executed.

Execution modes preferably comprise a first mode, termed "run mode," in which a processor fetches instructions from memory and executes the instructions, and a second mode, termed "step-by-step mode," in which the processor executes, but does not fetch instructions. In a preferred embodiment, the run mode of a processor may be used when more than a threshold number of consecutive instructions (e.g., three or more) are to be executed by the same processor, while the step-by-step mode of a processor may be used when less than a threshold number of consecutive instructions are to be executed by the processor. The step-by-step mode also may be used to update internal registers of the first processor that are accessible through instruction operand source or destination.

In at least some embodiments, a first processor switches between the run mode and step-by-step mode described above and a second processor coordinates when the mode switches occur according to an order, arrangement, or pattern of instructions. For example, the second processor may use a threshold number of consecutive instructions as previously described to coordinate the mode switches of the first processor. The second processor also may provide instructions to the first processor when the first processor is in the step-by-step mode such that the first processor does not fetch those instructions. Therefore, when in the step-by-step mode, a program counter of the first processor (typically used for fetching new instructions) may not be updated because the instructions are provided by the second processor In at least some embodiments, the first and second processors may be coupled together and used to operate a portable, battery-operated cell phone. As shown in FIG. 1, a cell phone, or mobile communication device, may comprise an integrated keypad 112, display 114, and outer case 115. Electronic components and software including at least some of the components disclosed herein, may be included in electronics package 110 connected to the keypad 112, display 114, and radio frequency ("RF") circuitry 116. The RF circuitry 116 may be connected to an antenna 118.

Referring now to FIG. 2, a system 200 is shown in accordance with a preferred embodiment of the invention. As shown, the system 200 may comprise a first processor 202, a second processor 204 coupled to the first processor 200 through an inter-processor bus 220, and memory 206 coupled to the first and second processors 202, 204 through memory buses 222, 224, respectively. In a preferred embodiment, the inter-processor bus 220 is a dedicated bus (i.e., the bus is permanently assigned for a specific function), although other embodiments may use other existing bus interfaces (e.g., memory interface and peripheral interface). The first processor 202 may comprise decode logic 210 coupled to fetch logic 212. The decode logic 210 also may couple to port 214 through a switch 230. The port 214 also may couple to registers 216. The second processor 204 may include a control program 218. Other components (not shown) may be included as well.

For the purpose of describing the embodiments of the invention, two categories of instructions ("supported" and "unsupported") will be described herein. "Supported" instructions include instructions that are executed or executable by the first processor 202. "Unsupported" instructions include instructions that are not executable by the first processor 202. Additionally, unsupported instructions may include instructions that are executable by the first processor, but are assigned or otherwise allocated to be executed by the second processor. In general, the system 200 may execute applications that contain both supported and unsupported instructions. In at least some embodiments of the invention, the first processor 202 executes the supported instructions and the second processor 204 executes the unsupported instructions.

In operation, the first processor 202 fetches and executes supported instructions in the run mode until an unsupported instruction is detected. More specifically, in the first processor's run mode, the fetch logic 212 of the first processor 202 fetches supported instructions from memory 206 through the memory bus 224 and the decode logic 210 decodes the fetched instructions. If the first processor 202 or the control program 218 of the second processor 204 detects or otherwise encounters an unsupported instruction, the second processor 204 is activated or switches context from a previous task to execute the unsupported instruction.

For example, the first processor 202 may fetch the unsupported instruction, store the unsupported instruction in registers 216, and send a signal via the inter-processor bus 220 to the second processor 204. In response, the second processor 204 retrieves the unsupported instruction from registers 216 using, for example, a read instruction. In other embodiments, the first processor may fetch the unsupported instruction from memory 206 through the memory bus 222.

In other possible embodiments, the control program 218 running on the second processor 204 may detect the unsupported instruction by inspecting instructions that are yet to be executed. When the control program 218 detects an unsupported instruction, the second processor 204 activates or switches context to execute the unsupported instruction. The timing of when the second processor 204 activates or switches context is preferably coordinated to allow the first and second processors 202, 204 to optimize overall efficiency. For example, it may be more efficient for the second processor 204 to finish a present task before executing the unsupported instruction (i.e. the performance cost of switching context may be greater than the benefit of parallel processing). In some embodiments, a pre-determined priority known by the control program 218 determines when the second processor 204 finishes a task, switches context, executes the unsupported instruction, etc.

As mentioned above, the control program 218 may examine instructions that are yet to be executed to differentiate supported and unsupported instructions. More specifically, the control program 218 may examine instruction "signatures" (e.g., instruction type or length) to detect an unsupported instruction, whereby the second processor 204 activates or switches context to execute the unsupported instruction as described above.

In addition to detecting unsupported instructions, the control program 218 may examine an order, arrangement, or pattern of supported and unsupported instructions yet to be executed. As previously mentioned, the control program 218 may use instruction signatures to detect supported and unsupported instructions. If more than a threshold number of consecutive supported instructions (e.g., three or more) are detected, the control program 218 causes the first processor 202 to transition to the run mode whereby the supported instructions are fetched from memory 206 and executed by the first processor 202 as previously described. If less than the threshold number of consecutive supported instructions are detected, the control program 218 causes the first processor 202 to transition to the step-by-step mode described below.

In the step-by-step mode, the second processor fetches a supported instruction from memory 206 through memory bus 222, and loads the instruction in the decode logic 210 of the first processor 202. In at least some embodiments, the switch 230 closes when the first processor 202 transitions to the step-by-step mode so that the decode logic 210 is connected to port 214 and may be accessed by the second processor 204. The switch 230 may comprise any electrical apparatus for controlling the coupling of port 214 to decode logic 210. The second processor 204 may load supported instructions to the decode logic 210 of the first processor 202 using a memory mapped instruction buffer, co-processor instruction, or other instruction, wherein the supported instructions are sent from the second processor 204 via the inter-processor bus 220, port 214, and switch 230 to the decode logic 210 of first processor 204 for decoding and subsequent execution in the first processor 202.

The step-by-step mode described above is maintained to execute less than a threshold number of supported instructions until the control program 218 determines an unsupported instruction is the next (or current) instruction in an application to be executed. The second processor 204 then fetches and executes the unsupported instruction as described above. The control program 218 may examine the order, arrangement, or pattern of supported and unsupported instructions yet to be executed before, during, or after each unsupported instruction is executed such that the run modes and step-by-step modes of the first processor 202 are coordinated as described herein.

FIG. 3 is a flowchart illustrating a method 300 of coordinating multiple execution modes of a processor in accordance with an embodiment of the invention. As shown in FIG. 3, the method 300 may begin at block 302 when a first processor 202 fetches and decodes instructions. Block 302 may be the run mode described above. In 304, an unsupported instruction is detected and in block 306 a second processor 204 executes the unsupported instruction. If, at 308, there are less than a threshold number of supported instructions before another unsupported instruction, the second processor 204 provides any supported instructions to the first processor for execution thereon (block 310). Block 310 may be the step-by-step mode described above, after which control loops back to block 306 in which the second processor 204 executes the "current" unsupported instruction. If, at 308, there are not less than a threshold number of supported instruction before another unsupported instruction, control loops back to block 302 in which the first processor 202 fetches and decodes instructions. In a preferred embodiment, the method 300 is able to repeat (as shown) in order to allow continuous coordination of multiple processors.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A method comprising:
   fetching and decoding instructions in a first processor;
   detecting an unsupported instruction that is not executable by the first processor;
   executing said unsupported instruction in a second processor; and
   providing the first processor with a supported instruction that is executable in the first processor by loading the supported instruction in decode logic of the first processor without the first processor fetching any portion of said supported instruction, wherein the second processor fetches the supported instruction and loads the supported instruction in the decode logic of the first processor.

2. The method of claim 1 wherein providing the first processor with the supported instruction comprises loading the supported instruction in the decode logic of the first processor by accessing a port addressable by the second processor.

3. The method of claim 1 further comprising detecting patterns of supported and unsupported instructions yet to be executed to determine when to perform said providing the first processor with the supported instruction that is executable in the first processor without the first processor fetching any portion of said supported instruction.

4. The method of claim 3 wherein said patterns comprise an unsupported instruction followed by less than a threshold number of consecutive supported instructions before the next unsupported instruction.

5. A system comprising:
   a first processor having fetch logic and decode logic, the first processor fetches supported instructions from memory using said fetch logic and decodes said supported instructions with said decode logic;
   a second processor, the second processor executes unsupported instructions;
   means for loading a supported instruction in said decode logic of the first processor so that the first processor decodes but does not fetch any portion of the supported instruction, wherein the second processor fetches the supported instruction and loads the supported instruction in the decode logic of the first processor;

means for coordinating when said loading the supported instruction in said decode logic of the first processor so that the first processor decodes but does not fetch any portion of the supported instruction occurs.

6. The system of claim 5 wherein said means for loading the supported instruction in said decode logic of the first processor so that the first processor decodes but does not fetch any portion of the supported instruction comprises coupling the decode logic to a port addressable by the second processor, wherein the second processor fetches the supported instruction and loads said supported instruction in the decode logic of the first processor by accessing said port.

7. The system of claim 6 wherein a switch permits said coupling the decode logic to the port addressable by the second processor.

8. The system of claim 5 wherein said means for coordinating when said loading the supported instruction in said decode logic of the first processor so that the first processor decodes but does not fetch any portion of the supported instruction occurs comprises a control program that examines patterns of supported and unsupported instructions yet to be executed and causes the first processor to switch between multiple instruction execution modes according to the patterns, wherein said loading the supported instruction in the decode logic of the first processor so that the first processor decodes but does not fetch any portion of the supported instruction is one of said multiple instruction execution modes.

9. The system of claim 8 wherein said control program runs on the second processor.

10. The system of claim 8 wherein said patterns comprise an unsupported instruction followed by less than a threshold number of consecutive supported instructions before the next unsupported instruction.

11. The system of claim 10 wherein said threshold number is three.

12. A method comprising:
fetching and decoding instructions in a first processor;
detecting an unsupported instruction that is not executable by the first processor;
executing said unsupported instruction in a second processor;
providing the first processor with a supported instruction that is executable in the first processor by loading the supported instruction in decode logic of the first processor without the first processor fetching any portion of said supported instruction, wherein the second processor fetches the supported instruction and loads the supported instruction in the decode logic of the first processor; and
detecting patterns of supported and unsupported instructions yet to be executed.

13. The method of claim 12 wherein providing the first processor with the supported instruction comprises loading the supported instruction in the decode logic of the first processor by accessing a port addressable by the second processor.

14. The method of claim 12 wherein detecting patterns of supported and unsupported instructions yet to be executed is used to determine when to perform said providing the first processor with the supported instruction that is executable in the first processor without the first processor fetching any portion of said supported instruction.

15. The method of claim 14 wherein said patterns comprise an unsupported instruction followed by less than a threshold number of consecutive supported instructions before the next unsupported instruction.

16. A system comprising:
a first processor having fetch logic and decode logic, the first processor fetches supported instructions from memory using said fetch logic and decodes said supported instructions with said decode logic;
a second processor, the second processor executes unsupported instructions;
means for loading a supported instruction in said decode logic of the first processor so that the first processor decodes but does not fetch any portion of the supported instruction, wherein the second processor fetches the supported instruction and loads the supported instruction in the decode logic of the first processor;
means for coordinating when said loading the supported instruction in said decode logic of the first processor so that the first processor decodes but does not fetch any portion of the supported instruction occurs comprises a control program that examines patterns of supported and unsupported instructions yet to be executed and causes the first processor to switch between multiple instruction execution modes according to the patterns.

17. The system of claim 16 wherein said means for loading the supported instruction in said decode logic of the first processor so that the first processor decodes but does not fetch any portion of the supported instruction comprises coupling the decode logic to a port addressable by the second processor, wherein the second processor fetches the supported instruction and loads said supported instruction in the decode logic of the first processor by accessing said port.

18. The system of claim 17 wherein a switch permits said coupling the decode logic to the port addressable by the second processor.

19. The system of claim 16 wherein said loading the supported instruction in the decode logic of the first processor so that the first processor decodes but does not fetch any portion of the supported instruction is one of said multiple instruction execution modes.

20. The system of claim 19 wherein said control program runs on the second processor.

21. The system of claim 19 wherein said patterns comprise an unsupported instruction followed by less than a threshold number of consecutive supported instructions before the next unsupported instruction.

22. The system of claim 21 wherein said threshold number is three.

* * * * *